(12) United States Patent
Guo et al.

(10) Patent No.: US 11,015,021 B2
(45) Date of Patent: May 25, 2021

(54) METHOD FOR PREPARATION OF A POLYESTER

(71) Applicant: NANJING TECH UNIVERSITY, Jiangsu (CN)

(72) Inventors: Kai Guo, Jiangsu (CN); Fulan Wei, Jiangsu (CN); Zhenjiang Li, Jiangsu (CN); Hui Zhu, Jiangsu (CN); Siming Chen, Jiangsu (CN); Yu Gao, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 13 days.

(21) Appl. No.: 16/607,645

(22) PCT Filed: Apr. 24, 2018

(86) PCT No.: PCT/CN2018/084185
§ 371 (c)(1),
(2) Date: Oct. 23, 2019

(87) PCT Pub. No.: WO2018/196730
PCT Pub. Date: Nov. 1, 2018

(65) Prior Publication Data
US 2020/0140608 A1    May 7, 2020

(30) Foreign Application Priority Data

Apr. 28, 2017    (CN) .......................... 201710296909.X

(51) Int. Cl.
*C08G 63/82* (2006.01)
*C08G 63/08* (2006.01)
*C08G 63/42* (2006.01)

(52) U.S. Cl.
CPC ........... *C08G 63/823* (2013.01); *C08G 63/08* (2013.01); *C08G 63/42* (2013.01)

(58) Field of Classification Search
CPC ...... C08G 63/823; C08G 63/08; C08G 63/42; C08G 64/30
See application file for complete search history.

(56) References Cited

U.S. PATENT DOCUMENTS

| | | |
|---|---|---|
| 3,736,646 A | 6/1973 | Schmitt |
| 4,045,418 A | 8/1977 | Sinclair |
| 4,057,537 A | 11/1977 | Sinclair |
| 5,235,031 A | 8/1993 | Drysdale et al. |
| 5,357,034 A | 10/1994 | Fridman et al. |

FOREIGN PATENT DOCUMENTS

| | | |
|---|---|---|
| CN | 1814644 A | 8/2006 |
| CN | 1814645 A | 8/2006 |
| CN | 102015825 A | 4/2011 |
| CN | 102190779 A | 9/2011 |
| CN | 104530393 A | 4/2015 |
| CN | 105153408 A | 12/2015 |
| CN | 105199084 A | 12/2015 |
| WO | 2004052980 A1 | 6/2004 |
| WO | 2008104723 A1 | 9/2008 |

OTHER PUBLICATIONS

Fredrik Nederberg et al., "New Paradigms for Organic Catalysts: The First Organocatalytic Living Polymerization", Angewandte Chemie International Editon, 2001, vol. 40, No. 14, pp. 2712-2715.
Fredrik Nederberg et al., "Organocatalytic chain scission of poly(lactides): a general route to controlled molecular weight, functionality and macromolecular architecture", Chemical Communications, 2001, pp. 2066-2067.

*Primary Examiner* — Robert S Jones, Jr.
(74) *Attorney, Agent, or Firm* — Novick, Kim & Lee, PLLC; Allen Xue

(57) ABSTRACT

Disclosed in the present invention is a preparation method for a polyester, relating to the technical field of organic catalysis and polymeric materials. The preparation method in the present invention comprises: (1) using pyridine and saccharin in a ratio of 1:1 to prepare pyridine saccharin salt in tetrahydrofuran at 60° C. and separating the pyridine saccharin salt out in methanol and hexane. (2) Freeing out a small amount of pyridine from the pyridine saccharin salt in a heating state, catalyzing by the pyridine saccharin salt and pyridine a cyclic lactone or a carbonate to be ring-opened and polymerized to form the polyester; and the system has no other compound residues. (3) In the presence of an alcohol initiator, catalyzing by the pyridine saccharin salt the cyclic lactone to be ring-opened and polymerized to obtain the polyester. The catalytic system can efficiently synthesize a specific polylactone. Compared with a method for synthesizing a polyester by the use of a metal-containing catalyst in the prior art, the system has wide application. Moreover, the system is advantageous of no metal residue, narrow molecular weight distribution and no chain transesterification, and therefore has great commercial application potential in bio-pharmaceutical field and microelectronic field.

10 Claims, 4 Drawing Sheets

METHOD FOR PREPARATION OF A POLYESTER

TECHNICAL FIELD

The invention belongs to the technical field of organic catalysis and polymeric materials, and particularly relates to a method for preparing a polyester by using a pyridine saccharide salt.

BACKGROUND ART

As an important branch of biomedicine, bioengineering material is an interdisciplinary subject of medicine, biology, and material chemistry. To be precise, bioengineering materials are "inanimate materials that are in contact with tissue to be functional for a medical purpose." Polylactic acid, polycaprolactone, polyvalerolactone and polycarbonate are biodegradable and bioabsorbable polymer materials, which are easy to be blended with other polymer materials, and can improve the degradability of polymer materials. As a fully degradable environmentally friendly material derived from renewable resource crops, they have attracted widespread attention and research around the world.

The preparation of a polyester has been extensively studied, among which ring-opening polymerization with cyclic lactones is one of the most studied methods. In the case of the catalyst for the ring-opening polymerization of lactide, a metal-containing catalyst was used for a ring-opening polymerization of lactide to prepare polylactic acid in the early stage patents such as CN1814644, CN1814645 and U.S. Pat. Nos. 5,235,031, 5,357,034, 4,045,418, 4,057,537, and 3,736,646. However, these methods cannot be applied to fields such as biomedicine and microelectronics as the reaction time is longer, and it is extremely difficult to remove metal residues from the obtained polylactic acid. Connor et. al (Fredrik Nederber et. al., Angewandte Chemie International Edition, 2001, 40, 2712-2715) later proposed using an organic catalyst to catalyze the ring-opening polymerization of lactide to prepare polylactic acid, and attempted to use 4-dimethylaminopyridine as a catalyst. However, 4-dimethylaminopyridine not only remains in the polymer, but also has severe skin toxicity. In order to avoid the release of harmful chemical agents into the environment, it has been found that salts formed from 4-dimethylaminopyridine (DMAP) ware easily separated from the product and could be recycled.

In 2001, Hedrick studied the work of ring-opening polymerization catalyzed by hydrogen bonds. In terms of efficiency and range, organic catalysts had become a comprehensive catalyst that can replace metal catalyst and enzyme catalyst. The hydrogen bond catalyst had the characteristics of mildness, high-efficiency, and no transesterification reaction, and low molecular weight distribution and non-racemic polylactic acid were obtained. It is precisely because of the excellent properties possessed by hydrogen bond catalysis that finding a better hydrogen bond catalyst has great commercial application value. At present, the type of hydrogen bond is limited, only a small amount of bifunctional catalyst is used, and the synthesis of these bifunctional catalysts is complicated.

In order to meet the requirements of the biomedical field and the microelectronic field on materials and the requirements of simple, mild and efficient synthesis of polymers with precise molecular weights, the invention finds problems and solves the problems from the actual needs, and utilizes an organic hydrogen bond catalyst to synthesize biodegradable high-molecular polymers with various precise molecular weights. Due to the deficiencies of DMAP catalysis, DMAP can be loaded with a carrier system in several ways, but fewer methods are reported and the activity and recyclability of the catalyst are not simultaneously manifested. The disadvantage of combining DMAP with nanomaterials is that very small amounts of catalyst can be recovered. The recovery of fluorine-labeled DMAP is good, but is expensive. In order to overcome the deficiencies of the above method, it is necessary to introduce a catalyst which is stable in structure, convenient to use, capable of well controlling the polymerization process, safe and free of redundant residues. The compound of Formula III, which is catalyzed by the stable structure of the seven-membered ring synthon bound by the hydrogen bond, has obvious advantages, and the obtained polymer has a narrow molecular weight distribution.

SUMMARY OF THE INVENTION

The present invention is aimed at providing a process for the preparation of a polyester, and a class of ring-opening polymerizations of cyclic lactones catalyzed by a pyridine saccharide salt-catalyzed system. Compared with the existing catalyst system, the invention has obvious advantages such as mildness, high efficiency, wide source, simple synthesis, variety, wide range and no metal.

A method for preparing a polyester, comprising the steps: an initiator alcohol initiates ring-opening of a cyclic lactone monomer or a cyclic carbonate monomer, and initiates ring-opening polymerization of a small molecule monomer under the catalysis of pyridine saccharin salt as shown in Formula III prepared by saccharin as shown in Formula I and a substituted pyridine ring as shown in Formula II to obtain a polyester;

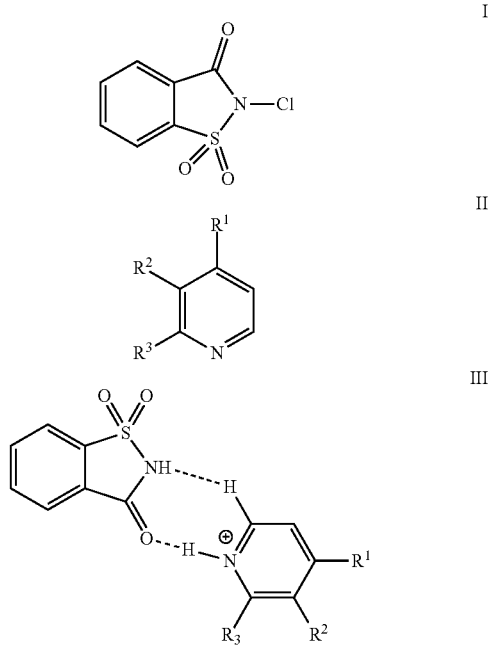

the saccharin is as shown in Formula I, and the substituted pyridine ring is as shown in Formula II, wherein $R^1$, $R^2$, and $R^3$ are selected from the group consisting of N,N-dimethylamino, pyrrolidinyl, hydrogen, an alkyl group having 1-10 carbon atoms, and an alkyl group having 1-10 carbon atoms and substituted with one or more of the same or different groups of a halogen atom, a hydroxyl group, a phenyl group or a substituted phenyl group.

In Formula II, when $R^1$ is selected from one of N,N-dimethylamino, pyrrolidinyl and hydrogen, $R^2$ and $R^3$ may be respectively selected from the same or different groups consisting of hydrogen, ethyl, isopropyl, tert-butyl or sec-butyl; or alkyl groups having 1-10 carbon atoms and substituted with the same or different groups selected from the group consisting of a halogen atom, a hydroxyl group, a phenyl group and a substituted phenyl group;

when $R^3$ is selected from one of N,N-dimethylamino, pyrrolidinyl, and hydrogen, $R^1$ and $R^2$ may be respectively selected from the same or different groups consisting of hydrogen, ethyl, isopropyl, t-butyl or sec-butyl; or alkyl groups having 1-10 carbon atoms and substituted with the same or different groups selected from the group consisting of a halogen atom, a hydroxyl group, a phenyl group and a substituted phenyl group.

Preferably the substituted pyridine ring as shown in Formula II has the structures shown in No. 1-12.

| No. | Structure |
| --- | --- |
| 1 | |
| 2 | |
| 3 | |
| 4 | |
| 5 | |
| 6 | |
| 7 | |
| 8 | |
| 9 | |
| 10 | |
| 11 | |

| No. | Structure |
| --- | --- |
| 12 | 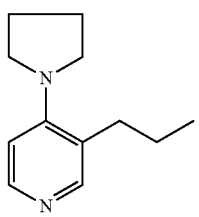 |

The pyridine saccharide salt catalyst as shown in Formula III is prepared through recrystallization of saccharin as shown in Formula I and a substituted pyridine ring as shown in Formula II in a tetrahydrofuran solution at 60° C. overnight.

The pyridine saccharide salt catalyst system of the present invention is stirred at a temperature of 60° C. in a 1:1 mixture of a substituted pyridine ring and saccharin in a tetrahydrofuran solution, and is recrystallized from methanol and hexane.

The monomer is selected from one or more of the group consisting of:

(1)

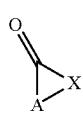

IV wherein A is [—($CR^1R^2$)—]$_n$, n is an integer of 2-10; $R^1$ and $R^2$ are selected from H, an alkyl group having 1-5 carbon atoms, and an alkyl group having 1-5 carbon atoms and substituted with a halogen atom or a hydroxyl group, $R^1$ and $R^2$ are selected from the same or different groups; X is selected from O or NH;

(2)

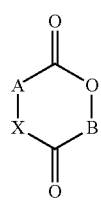

V wherein A and B are [—($CR^1R^2$)—]$_n$, n is an integer of 0-10, and A and B are the same or different; and $R^1$ and $R^2$ are selected from H, an alkyl group having 1-5 carbon atoms, and an alkyl group having 1-5 carbon atoms and substituted with a halogen atom or a hydroxyl group, $R^1$ and $R^2$ are selected from the same or different groups; X is selected from O or NH;

(3) trimethylene carbonate and cyclic carbonate as shown in formula (VI)

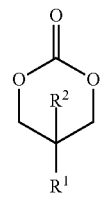

VI wherein $R^1$ and $R^2$ are selected from H, an alkyl group having 1-5 carbon atoms and substituted with a halogen atom or a hydroxyl group, and $R^1$ and $R^2$ are selected from the same or different groups.

The catalyst of the present invention is a pyridine saccharide salt catalyst as shown in Formula III prepared from saccharin as shown in Formula I and a substituted pyridine ring as shown in Formula II, representatively shown as structures of No. 13-22.

| No. | Structure |
| --- | --- |
| 13 | 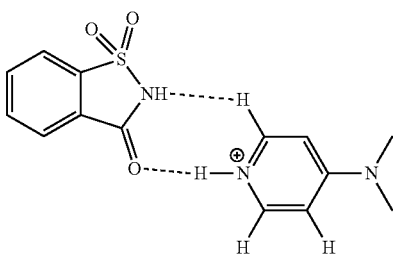 |
| 14 | 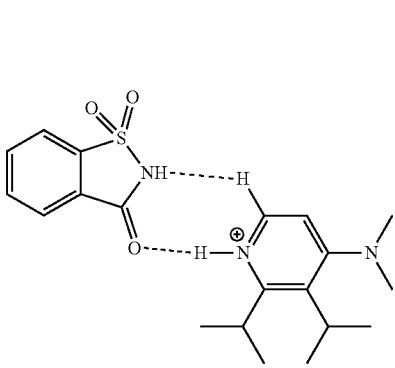 |
| 15 | 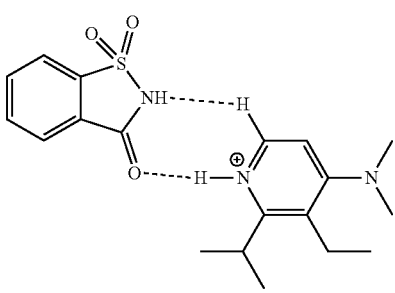 |

| No. | Structure |
|---|---|
| 16 | 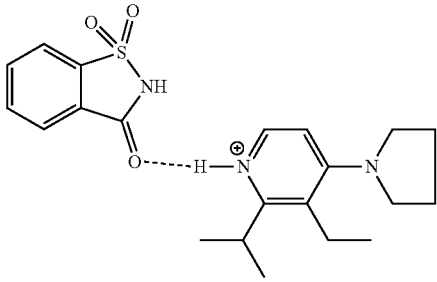 |
| 17 | 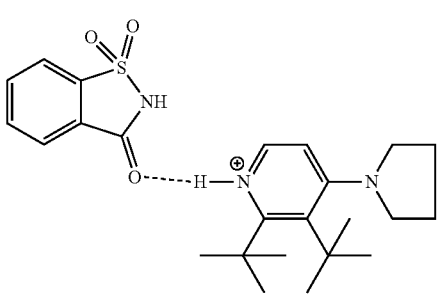 |
| 18 | 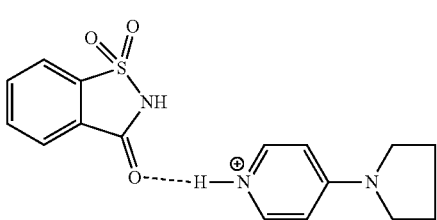 |
| 19 | 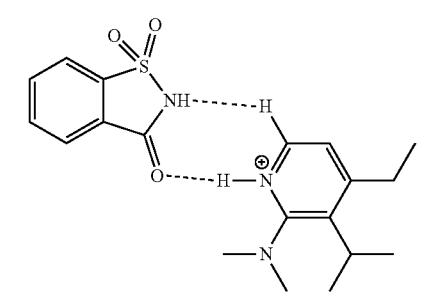 |
| 20 | 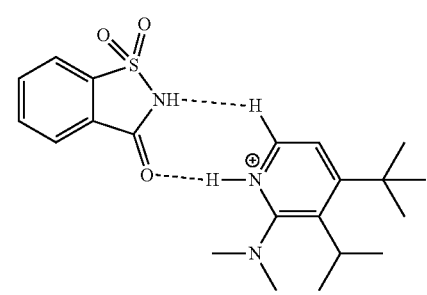 |

| No. | Structure |
|---|---|
| 21 | 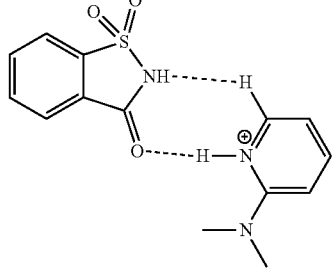 |
| 22 | 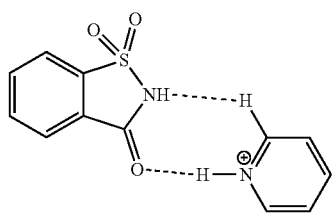 | the cyclic monomer is as shown in Formula (IV)

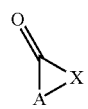

IV wherein A is $[-(CR^1R^2)-]_n$ when n=2, $R^1$ and $R^2$ are selected from H, X is selected from O, and the cyclic monomer is β-propiolactone;

when n=3, $R^1$ and $R^2$ are selected from H, X is selected from O, and the cyclic monomer is γ-butyrolactone;

when n=4, $R^1$ and $R^2$ are selected from H, X is selected from O, and the cyclic monomer is δ-valerolactone;

when n=5, $R^1$ and $R^2$ are selected from H, X is selected from O, and the cyclic monomer is ε-caprolactone;

when n=10, $R^1$ and $R^2$ are selected from H, X is selected from O, and the cyclic monomer is macrocyclic undecanolactone;

when n=2, $R^1$ and $R^2$ are selected from H, X is selected from NH, and the cyclic monomer is β-propiolactam;

when n=5, $R^1$ and $R^2$ are selected from H, X is selected from NH, and the cyclic monomer is ε-caprolactam;

when n=5, $R^1$ is selected from a chlorine atom, $R^2$ is selected from H or $R^1$ is selected from H, $R^2$ is selected from a chlorine atom, X is selected from O, and the cyclic monomer is chlorocaprolactone.

The cyclic monomer is as shown in Formula (V)

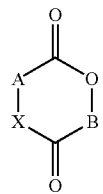

V wherein, A and B are $[-(CR^1R^2)-]_n$ when n=1, A and B are the same, $R^1$ and $R^2$ are selected from H, X is selected from O, and the cyclic monomer is glycolide;
when n=1, A and B are the same, $R^1$ is selected from methyl, $R^2$ is selected from H or $R^1$ is selected from H, $R^2$ is selected from methyl, X is selected from O, and the cyclic monomer is lactide;
when n=1, A and B are the same, $R^1$ is selected from bromine, $R^2$ is selected from H or $R^1$ is selected from H, $R^2$ is selected from bromine, X is selected from O, and the cyclic monomer is bromoglycolide;
when n=1, A and B are the same, $R^1$ is selected from methyl, $R^2$ is selected from H or $R^1$ is selected from H, $R^2$ is selected from methyl, X is selected from NH, and the cyclic monomer is 3,6-dimethyl morpholine-2,5-dione;
when n=2, A and B are the same, $R^1$ is selected from methyl, $R^2$ is selected from H or $R^1$ is selected from H, $R^2$ is selected from methyl, X is selected from O, and the cyclic monomer is tetranolide;
when n=8, A and B are the same, $R^1$ is selected from methyl, $R^2$ is selected from H or $R^1$ is selected from H, $R^2$ is selected from methyl, X is selected from O, and the cyclic monomer is decanolide;
when n=10, A and B are the same, $R^1$ is selected from methyl, $R^2$ is selected from H or $R^1$ is selected from H, $R^2$ is selected from methyl, X is selected from O, and the cyclic monomer is macrocyclic decanolide.
when A and B are different, n=1 in A, n=0 in B, $R^1$ and $R^2$ are selected from H, X is selected from O, and the cyclic monomer is an o-carboxyanhydride;
when A and B are different, n=1 in A, n=0 in B, $R^1$ and $R^2$ are selected from H, X is selected from N, and the cyclic monomer is an N-carboxyanhydride.

The monomer is trimethylene carbonate, hydroxytrimethylene carbonate, or chlorotrimethylene carbonate.

The cyclic monomer of the present invention, representatively, is shown in the structures of No. 23-34:

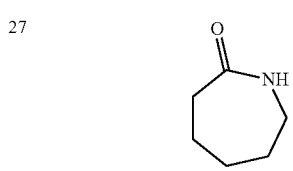

In order to solve the above technical problems, the idea of the present invention is as follows:

(1) Using pyridine and saccharin in a ratio of 1:1 to prepare pyridine saccharin salt in tetrahydrofuran at 60° C. and separating the pyridine saccharin salt out in methanol and hexane.

(2) Freeing out a small amount of pyridine from the pyridine saccharin salt in a heating state, catalyzing by the pyridine saccharin salt and pyridine a cyclic lactone or a carbonate to be ring-opened and polymerized to form the polyester; and the system has no other compound residues.

(3) In the presence of an alcohol initiator, catalyzing by the pyridine saccharin salt the cyclic lactone to be ring-opened and polymerized to obtain the polyester.

The present inventors have found that the difference in pyridine ring substituents will affect the catalytic efficiency. In the ring-opening polymerization reaction, it is necessary to determine a suitable temperature and temperature variation range according to the properties of the polymerization product and the process conditions of the polymerization reaction device, and to ensure that the polymerization reaction proceeds efficiently within a certain temperature range.

The controlled distribution of the polyester terminal structure and molecular weight, for example, the narrow molecular weight distribution, can be solved by adding an active hydrogen-containing compound (ROH) as an initiator in the ring-opening polymerization reaction, wherein the initiated monomer terminal structures are R—O— and —OH respectively, and the ratio of lactone monomer to initiator determines the target molecular weight of the resulting polyester. Under the condition of an initiator, the pyridine saccharin salt is subjected to ring-opening polymerization into active polymerization, the obtained polymer does not contain metal residues, the molecular weight and the terminal structure are controllable, and the molecular weight distribution is narrow.

The technical solution of the present invention is as follows:

The polyester process employs a bulk polymerization process, specifically comprising a molar ratio of cyclic lactone monomer or a cyclic carbonate monomer to the catalyst pyridine saccharide salt of 5-500, preferably 20-200, particularly preferably 30-150. The reaction temperature is −50-200° C., preferably 50-180° C., particularly preferably 90-150° C.; and the reaction time is 3 sec-120 h, preferably 0.2-24 h, particularly preferably 0.2-15 h.

The initiator is an alcohol compound, such as methanol, ethanol, n-propanol, isopropanol, n-butanol, tert-butanol, benzyl alcohol, phenylethyl alcohol, ethylene glycol, triethyleneglycol or pentaerythritol, preferably n-butanol, benzyl alcohol and phenylethyl alcohol. The cyclic lactone monomer is lactide (LA) and δ-valerolactone;

in the bulk polymerization process, the reaction can be carried out in an inert gas or under vacuum, the inert gas is preferably argon or nitrogen; the vacuum means that the pressure in the reactor is 4-20 mmHg; the reaction product is preferably purified by dissolving in a good solvent, and then separating out a solvent such as methanol, ethanol or water, wherein the good solvent is dichloromethane, chloroform, toluene, benzene, acetone or tetrahydrofuran, preferably dichloromethane, chloroform, and tetrahydrofuran.

Beneficial Effects:

(1) According to the invention, the specific polyester (polylactic acid and polypentalactone) can be efficiently synthesized through the catalytic system, compared with the synthetic polyester containing the metal catalyst (stannous octoates) in the prior art, the method has wide application range, no metal residue, narrow molecular weight distribution and no chain transesterification reaction, and has great commercial application potential in the fields of biomedicine and microelectronics.

(2) Compared with the reported organic catalysis strong acids (trifluoromethanesulfonic acid) and strong bases (N-heterocyclic carbene), the catalytic system disclosed by the invention has the advantages of high catalytic efficiency and mild characteristics by catalyzing the polymerization reaction through the action of hydrogen bonds.

(3) In the present invention, dimethylaminopyridinose salt (DMAP.saccharin) is synthesized by one-step reaction of commercially available saccharin and a pyridine ring, and is obtained by recrystallization from methanol and hexane. And moreover, the invention has no skin toxicity of DMAP and can be recycled.

(4) According to the process, the product polylactic acid with the target molecular weight can be synthesized in a controlled manner according to requirements, which has the advantages of narrow molecular weight distribution index, high product yield, no monomer residue, and snow white color. In summary, compared with the existing catalytic system, the invention has the obvious advantages of mildness, high efficiency, wide source, simple synthesis, numerous varieties, wide range, no metal and the like.

BRIEF DESCRIPTION OF THE DRAWINGS

Examples of the present invention will be described in detail with reference to the accompanying drawings, in which.

DETAILED DESCRIPTION OF THE INVENTION

Figure 1:
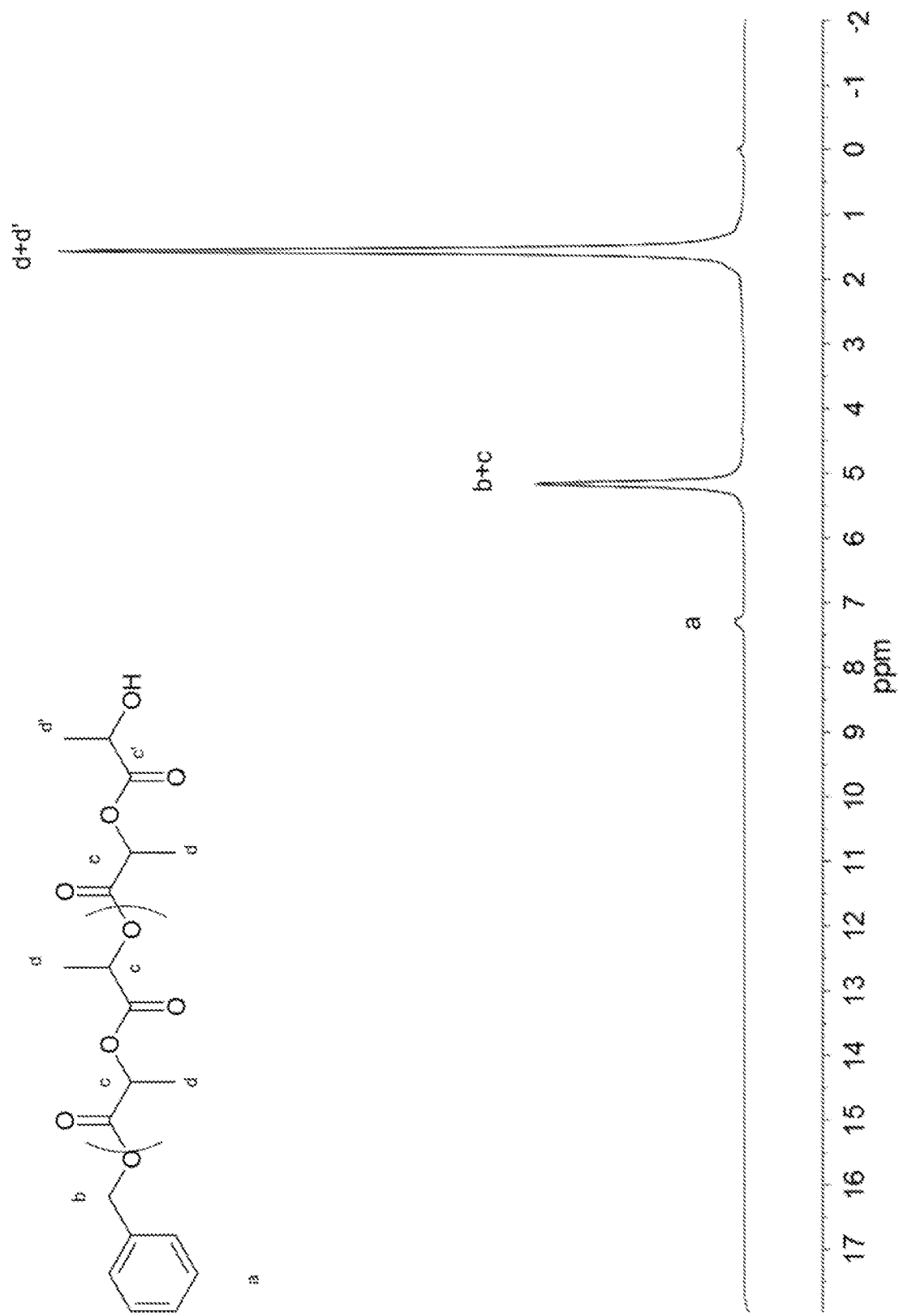
FIG. 1: $^1$H NMR spectrum of polylactic acid prepared by using 4-(N,N-dimethylamino) pyridine saccharin salt as a catalyst.
Figure 2:
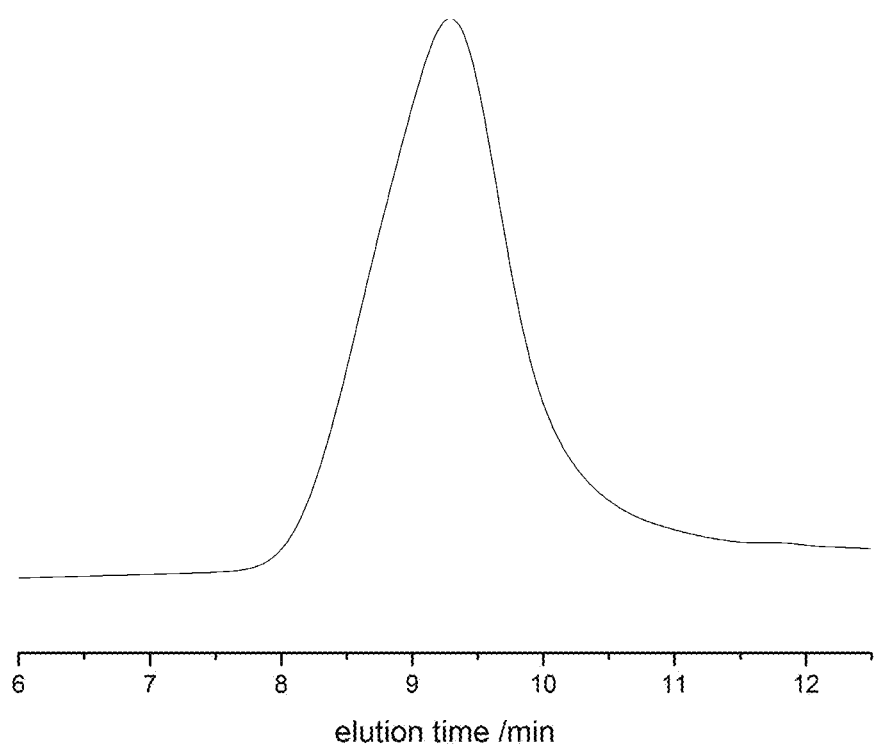
FIG. 2: the chromatogram of size exclusion chromatography of polylactic acid prepared by using 4-(N,N-dimethylamino) pyridine saccharin salt as a catalyst.
Figure 3:
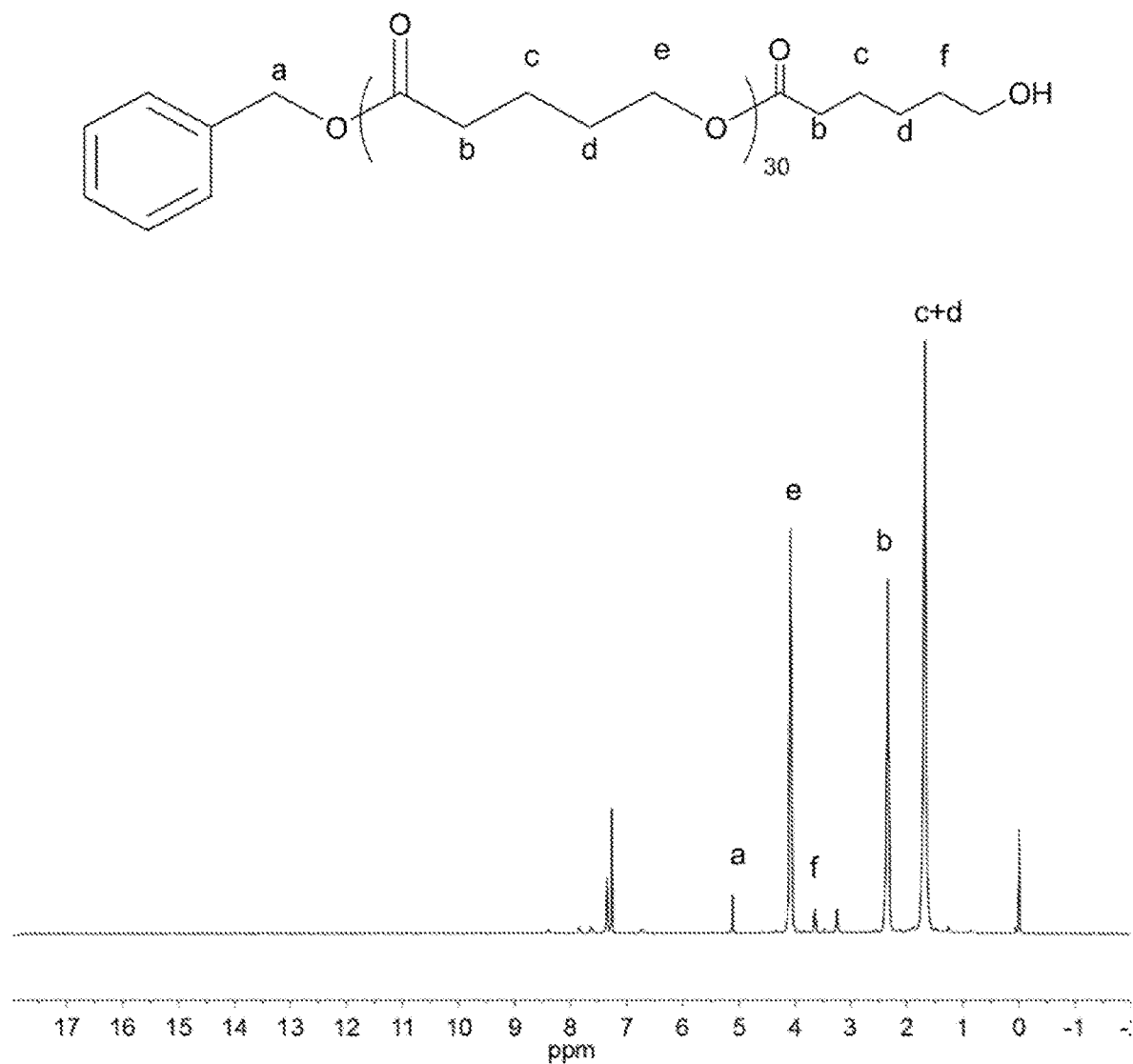
FIG. 3: $^1$H NMR spectrum of polypentalactone prepared by using 4-(N,N-dimethylamino) pyridine saccharin salt as a catalyst.
Figure 4:
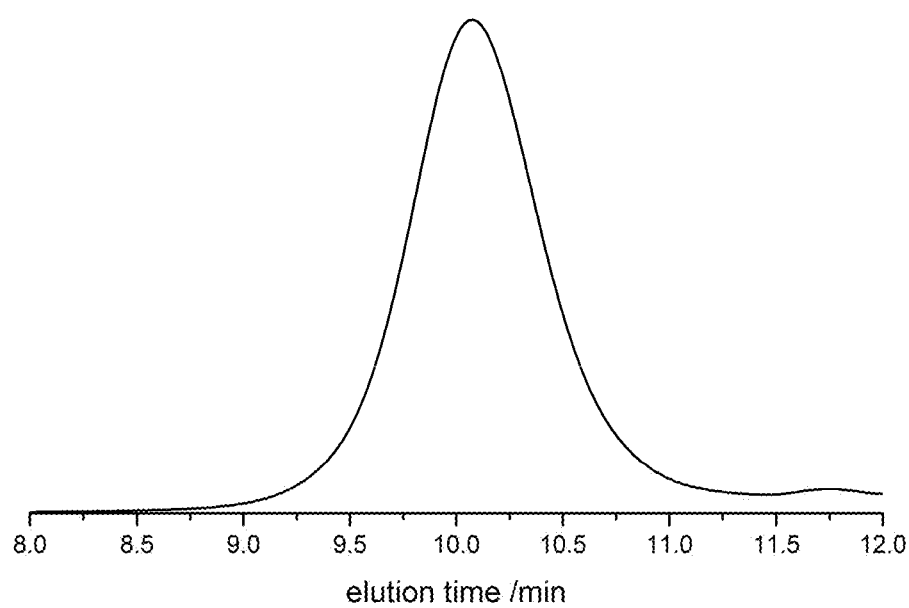
FIG. 4: the chromatogram of size exclusion chromatography of polypentalactone prepared by using 4-(N,N-dimethylamino) pyridine saccharin salt as a catalyst.

The invention is further illustrated by the following examples, which are intended to illustrate and not to limit the invention. Those skilled in the art will appreciate that the examples do not limit the invention in any way, and that suitable modifications and data changes may be made thereto without departing from the spirit and scope of the invention.

The structure of the catalyst pyridine saccharin salt used in the examples is as shown in formula III:

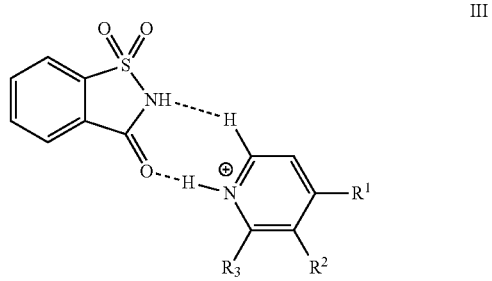

Example 1

In a 10 mL polymerization tube, butyrolactone (0.3856 g, 2.88 mmol), benzyl alcohol (10 μL, 0.096 mmol), and compound No. 13 (0.029 g, 0.096 mmol) were added and the reaction was magnetically stirred for 2 h at 90° C. After the reaction was finished, the obtained crude product was dissolved in a minimum amount of dichloromethane, and then the mixture was added into a cold methanol solution to separate out polymers. 0.23 g of a white solid was obtained by centrifugation and then transferred to a vacuum oven for drying. The structure of the polymer was identified by $^1$H NMR and $^{13}$C NMR, and the molecular weight and dispersity of the polymer were determined by GPC. After the determination, the conversion of the polymer was 90.6%, the number average molecular weight Mn was 2600 g mol$^{-1}$ and the Mn/Mw was 1.36. To the compound No. 13 in a 250 ml reaction flask were added compound No. 1 (12.27 mmol, 1.5 g) and saccharin (12.27 mmol, 1.5 g) and the resultant mixture was stirred in a tetrahydrofuran (THF) solution overnight at 60° C. The solvent was removed under vacuum to give the crude product to which methanol (10 ml) and hexane (20 ml) were added for recrystallization to give white crystals over a period of time at room temperature, which were filtered and dried for later use.

Example 2

In a 10 mL polymerization tube, valerolactone (0.288 g, 2.88 mmol), benzyl alcohol (10 µL, 0.096 mmol), and compound No. 14 (0.0375 g, 0.096 mmol) were added and the reaction was magnetically stirred for 1 h at 90° C. After the reaction was finished, the obtained crude product was dissolved in a minimum amount of dichloromethane, and then the mixture was added into a cold methanol solution to separate out polymers. 0.21 g of a white solid was obtained by centrifugation and then transferred to a vacuum oven for drying. The structure of the polymer was identified by $^1$H NMR and $^{13}$C NMR, and the molecular weight and dispersity of the polymer were determined by GPC. After the determination, the conversion of the polymer was 92.8%, the number average molecular weight Mn was 2900 g mol$^{-1}$ and the Mn/Mw was 1.21. To the compound No. 14 in a 250 ml reaction flask were added compound No. 2 (12.27 mmol, 1.5 g) and saccharin (12.27 mmol, 1.5 g) and the resultant mixture was stirred in a tetrahydrofuran (THF) solution overnight at 60° C. The solvent was removed under vacuum to give the crude product to which methanol (10 ml) and hexane (20 ml) were added for recrystallization to give white crystals over a period of time at room temperature, which were filtered and dried for later use.

Example 3

In a 10 mL polymerization tube, caprolactone (0.328 g, 2.88 mmol), benzyl alcohol (10 µL, 0.096 mmol), and compound No. 16 (0.038 g, 0.096 mmol) were added and the reaction was magnetically stirred for 1 h at 100° C. After the reaction was finished, the obtained crude product was dissolved in a minimum amount of dichloromethane, and then the mixture was added into a cold methanol solution to separate out polymers. 0.23 g of a white solid was obtained by centrifugation and then transferred to a vacuum oven for drying. The structure of the polymer was identified by $^1$H NMR and $^{13}$C NMR, and the molecular weight and dispersity of the polymer were determined by GPC. After the determination, the conversion of the polymer was 98.7%, the number average molecular weight Mn was 3500 g mol$^{-1}$ and the Mn/Mw was 1.37. To the compound No. 16 in a 250 ml reaction flask were added compound No. 4 (12.27 mmol, 1.5 g) and saccharin (12.27 mmol, 1.5 g) and the resultant mixture was stirred in a tetrahydrofuran (THF) solution overnight at 60° C. The solvent was removed under vacuum to give the crude product to which methanol (10 ml) and hexane (20 ml) were added for recrystallization to give white crystals over a period of time at room temperature, which were filtered and dried for later use.

Example 4

In a 10 mL polymerization tube, glycolide (0.6682 g, 5.76 mmol), benzyl alcohol (10 µL, 0.096 mmol), and compound No. 18 (0.032 g, 0.096 mmol) were added and the reaction was magnetically stirred for 3 h at 140° C. After the reaction was finished, the obtained crude product was dissolved in a minimum amount of dichloromethane, and then the mixture was added into a cold methanol solution to separate out polymers. 0.47 g of a white solid was obtained by centrifugation and then transferred to a vacuum oven for drying. The structure of the polymer was identified by $^1$H NMR and $^{13}$C NMR, and the molecular weight and dispersity of the polymer were determined by GPC. After the determination, the conversion of the polymer was 92.9%, the number average molecular weight Mn was 6600 g mol$^{-1}$ and the Mn/Mw was 1.24. To the compound No. 18 in a 250 ml reaction flask were added compound No. 6 (12.27 mmol, 1.5 g) and saccharin (12.27 mmol, 1.5 g) and the resultant mixture was stirred in a tetrahydrofuran (THF) solution overnight at 60° C. The solvent was removed under vacuum to give the crude product to which methanol (10 ml) and hexane (20 ml) were added for recrystallization to give white crystals over a period of time at room temperature, which were filtered and dried for later use.

Example 5

In a 10 mL polymerization tube, lactide (1.2441 g, 8.64 mmol), benzyl alcohol (10 µL, 0.096 mmol), and compound No. 19 (0.036 g, 0.096 mmol) were added and the reaction was magnetically stirred for 5 h at 140° C. After the reaction was finished, the obtained crude product was dissolved in a minimum amount of dichloromethane, and then the mixture was added into a cold methanol solution to separate out polymers. 0.87 g of a white solid was obtained by centrifugation and then transferred to a vacuum oven for drying. The structure of the polymer was identified by $^1$H NMR and $^{13}$C NMR, and the molecular weight and dispersity of the polymer were determined by GPC. After the determination, the conversion of the polymer was 93.4%, the number average molecular weight Mn was 12100 g mol$^{-1}$ and the Mn/Mw was 1.36. To the compound No. 19 in a 250 ml reaction flask were added compound No. 7 (12.27 mmol, 1.5 g) and saccharin (12.27 mmol, 1.5 g) and the resultant mixture was stirred in a tetrahydrofuran (THF) solution overnight at 60° C. The solvent was removed under vacuum to give the crude product to which methanol (10 ml) and hexane (20 ml) were added for recrystallization to give white crystals over a period of time at room temperature, which were filtered and dried for later use.

Example 6

In a 10 mL polymerization tube, bromoglycolide (0.794 g, 2.88 mmol), benzyl alcohol (10 µL, 0.096 mmol), and compound No. 21 (0.029 g, 0.096 mmol) were added and the reaction was magnetically stirred for 3 h at 140° C. After the reaction was finished, the obtained crude product was dissolved in a minimum amount of dichloromethane, and then the mixture was added into a cold methanol solution to separate out polymers. 0.56 g of a white solid was obtained by centrifugation and then transferred to a vacuum oven for drying. The structure of the polymer was identified by $^1$H NMR and $^{13}$C NMR, and the molecular weight and dispersity of the polymer were determined by GPC. After the determination, the conversion of the polymer was 93.4%, the number average molecular weight Mn was 7700 g mol$^{-1}$ and the Mn/Mw was 1.25. To the compound No. 21 in a 250 ml reaction flask were added compound No. 9 (12.27 mmol, 1.5 g) and saccharin (12.27 mmol, 1.5 g) and the resultant mixture was stirred in a tetrahydrofuran (THF) solution overnight at 60° C. The solvent was removed under vacuum to give the crude product to which methanol (10 ml) and hexane (20 ml) were added for recrystallization to give white crystals over a period of time at room temperature, which were filtered and dried for later use.

Example 7

In a 10 mL polymerization tube, tetranolide (0.4953 g, 2.88 mmol), benzyl alcohol (10 μL, 0.096 mmol), and compound No. 22 (0.025 g, 0.096 mmol) were added and the reaction was magnetically stirred for 10 h at 150° C. After the reaction was finished, the obtained crude product was dissolved in a minimum amount of dichloromethane, and then the mixture was added into a cold methanol solution to separate out polymers. 0.35 g of a white solid was obtained by centrifugation and then transferred to a vacuum oven for drying. The structure of the polymer was identified by $^1$H NMR and $^{13}$C NMR, and the molecular weight and dispersity of the polymer were determined by GPC. After the determination, the conversion of the polymer was 95.4%, the number average molecular weight Mn was 5100 g mol$^{-1}$ and the Mn/Mw was 1.28. To the compound No. 22 in a 250 ml reaction flask were added compound No. 10 (12.27 mmol, 1.5 g) and saccharin (12.27 mmol, 1.5 g) and the resultant mixture was stirred in a tetrahydrofuran (THF) solution overnight at 60° C. The solvent was removed under vacuum to give the crude product to which methanol (10 ml) and hexane (20 ml) were added for recrystallization to give white crystals over a period of time at room temperature, which were filtered and dried for later use.

Example 8

In a 10 mL polymerization tube, o-carboxyanhydride (0.4147 g, 5.76 mmol), benzyl alcohol (10 μL, 0.096 mmol), and compound No. 18 (0.036 g, 0.096 mmol) were added and the reaction was magnetically stirred for 5 h at 130° C. After the reaction was finished, the obtained crude product was dissolved in a minimum amount of dichloromethane, and then the mixture was added into a cold methanol solution to separate out polymers. 0.29 g of a white solid was obtained by centrifugation and then transferred to a vacuum oven for drying. The structure of the polymer was identified by 41 NMR and $^{13}$C NMR, and the molecular weight and dispersity of the polymer were determined by GPC. After the determination, the conversion of the polymer was 96.3%, the number average molecular weight Mn was 4300 g mol$^{-1}$ and the Mn/Mw was 1.27. To the compound No. 18 in a 250 ml reaction flask were added compound No. 6 (12.27 mmol, 1.5 g) and saccharin (12.27 mmol, 1.5 g) and the resultant mixture was stirred in a tetrahydrofuran (THF) solution overnight at 60° C. The solvent was removed under vacuum to give the crude product to which methanol (10 ml) and hexane (20 ml) were added for recrystallization to give white crystals over a period of time at room temperature, which were filtered and dried for later use.

Example 9

In a 10 mL polymerization tube, lactide (0.4147 g, 2.88 mmol), benzyl alcohol (10 μL, 0.096 mmol), and compound No. 13 (0.029 g, 0.096 mmol) were added and the reaction was magnetically stirred for 4 h at 120° C. After the reaction was finished, the obtained crude product was dissolved in a minimum amount of dichloromethane, and then the mixture was added into a cold methanol solution to separate out polymers. 0.28 g of a white solid was obtained by centrifugation and then transferred to a vacuum oven for drying. The structure of the polymer was identified by $^1$H NMR and $^{13}$C NMR, and the molecular weight and dispersity of the polymer were determined by GPC. After the determination, the conversion of the polymer was 98.4%, the number average molecular weight Mn was 4400 g mol$^{-1}$ and the Mn/Mw was 1.13. To the compound No. 13 in a 250 ml reaction flask were added compound No. 1 (12.27 mmol, 1.5 g) and saccharin (12.27 mmol, 1.5 g) and the resultant mixture was stirred in a tetrahydrofuran (THF) solution overnight at 60° C. The solvent was removed under vacuum to give the crude product to which methanol (10 ml) and hexane (20 ml) were added for recrystallization to give white crystals over a period of time at room temperature, which were filtered and dried for later use.

Example 10

In a 10 mL polymerization tube, lactide (0.4147 g, 2.88 mmol), benzyl alcohol (10 μL, 0.096 mmol), and compound No. 13 (0.029 g, 0.096 mmol) were added and the reaction was magnetically stirred for 2 h at 150° C. After the reaction was finished, the obtained crude product was dissolved in a minimum amount of dichloromethane, and then the mixture was added into a cold methanol solution to separate out polymers. 0.29 g of a white solid was obtained by centrifugation and then transferred to a vacuum oven for drying. The structure of the polymer was identified by $^1$H NMR and $^{13}$C NMR, and the molecular weight and dispersity of the polymer were determined by GPC. After the determination, the conversion of the polymer was 96.4%, the number average molecular weight Mn was 4400 g mol$^{-1}$ and the Mn/Mw was 1.29. To the compound No. 13 in a 250 ml reaction flask were added compound No. 1 (12.27 mmol, 1.5 g) and saccharin (12.27 mmol, 1.5 g) and the resultant mixture was stirred in a tetrahydrofuran (THF) solution overnight at 60° C. The solvent was removed under vacuum to give the crude product to which methanol (10 ml) and hexane (20 ml) were added for recrystallization to give white crystals over a period of time at room temperature, which were filtered and dried for later use.

The invention claimed is:

1. A method for preparing a polyester, comprising: conducting a ring-opening polymerization of a cyclic lactone monomer or a cyclic carbonate monomer in presence of an initiator alcohol and a catalyst to obtain a polyester, wherein the catalyst is a pyridine saccharin salt of Formula III prepared by a reaction between a saccharin of Formula I and a substituted pyridine ring of Formula II:

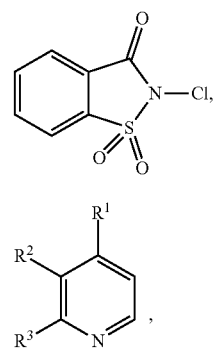

-continued

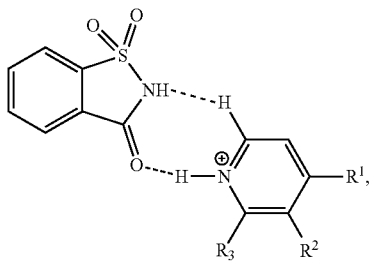

wherein, in Formula II, $R^1$, $R^2$, and $R^3$ are selected from N,N-dimethylamino, pyrrolidinyl, hydrogen, unsubstituted C1-C10 alkyl groups, and C1-C10 alkyl groups substituted with one or more of the same or different substituent selected from a halogen atom, a hydroxyl group, a phenyl group, and a substituted phenyl group.

2. The method according to claim 1, wherein, in Formula II, when $R^1$ is selected from one of N,N-dimethylamino, pyrrolidinyl, and hydrogen, $R^2$ and $R^3$ are independently selected from hydrogen, ethyl, isopropyl, tert-butyl, sec-butyl, and C1-C10 alkyl groups substituted with the same or different substituents selected from a halogen atom, a hydroxyl group, a phenyl group, and a substituted phenyl group; and when $R^3$ is selected from one of N,N-dimethylamino, pyrrolidinyl, and hydrogen, $R^1$ and $R^2$ are independently selected from hydrogen, ethyl, isopropyl, t-butyl, sec-butyl, C1-C10 alkyl groups substituted with the same or different substituents selected from a halogen atom, a hydroxyl group, a phenyl group, and a substituted phenyl group.

3. The method according to claim 2, wherein the substituted pyridine ring of Formula II has a structural formula selected from No. 1-12:

| No. | Structure |
|---|---|
| 1 | |
| 2 | |
| 3 | |

-continued

| No. | Structure |
|---|---|
| 4 | 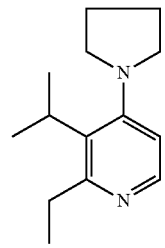 [SMILES: CCc1nccc(N2CCCC2)c1C(C)C] |
| 5 | 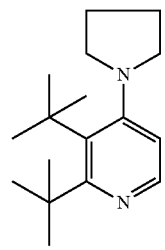 [SMILES: CC(C)(C)c1nccc(N2CCCC2)c1C(C)(C)C] |
| 6 | 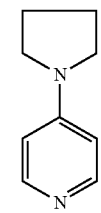 |
| 7 | 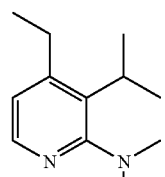 |
| 8 | 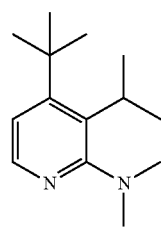 [SMILES: CC(C)c1c(C(C)(C)C)ccnc1N(C)C] |
| 9 | 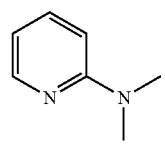 |
| 10 | 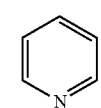 |

| No. | Structure |
|---|---|
| 11 | 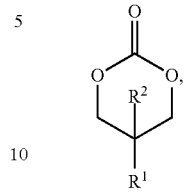 |
| 12 | 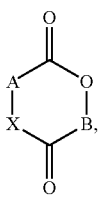 |

4. The method according to claim 1, wherein the pyridine saccharide salt of Formula III is prepared by recrystallization of the saccharin of Formula I and the substituted pyridine ring of Formula II in a tetrahydrofuran solution at 60° C.

5. The method according to claim 1, wherein the cyclic lactone monomer or the cyclic carbonate monomer is of Formula IV, Formula V, or Formula VI, wherein, in Formula IV,

IV

A is [—(CR$^1$R$^2$)—]$_n$, n is an integer of 2-10; R$^1$ and R$^2$ are independently selected from H, C1-C5 alkyl groups, and C1 and C5 alkyl groups substituted with a halogen atom or a hydroxyl group, X is O or NH, wherein, in Formula V,

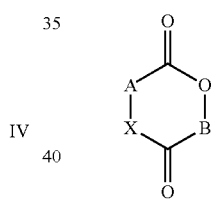

V

A and B are [—(CR$^1$R$^2$)—]$_n$, n is an integer of 0-10, and A and B are the same or different; and R$^1$ and R$^2$ are independently selected from H, C1-C5 alkyl groups, and C1 and C5 alkyl groups substituted with a halogen atom or a hydroxyl group, X is O or NH, and wherein, in Formula (VI)

VI

R$^1$ and R$^2$ are independently from H, C1-C5 alkyl groups substituted with a halogen atom or a hydroxyl group.

6. The method according to claim 5, wherein the cyclic monomer of Formula (IV) is β-propiolactone,
γ-butyrolactone,
δ-valerolactone,
ε-caprolactone,
macrocyclic undecanolactone,
β-propiolactam,
ε-caprolactam, or
chlorocaprolactone.

7. The method according to claim 5, wherein the cyclic monomer of Formula (V)

is glycolide,
lactide,
bromoglycolide,
3,6-dimethyl morpholine-2,5-dione,
tetranolide,
decanolide,
macrocyclic decanolide,
o-carboxyanhydride, or
N-carboxyanhydride.

8. The method according to claim 5, wherein the cyclic monomer is trimethylene carbonate, hydroxytrimethylene carbonate, or chlorotrimethylene carbonate.

9. The method according to claim 1, wherein the initiator alcohol is methanol, ethanol, n-propanol, isopropanol, n-butanol, tert-butanol, benzyl alcohol, phenylethyl alcohol, ethylene glycol, triethyleneglycol or pentaerythritol.

10. The preparation method according to claim 1, wherein the ring-opening polymerization is carried out at 90-150° C., and further comprises dissolving a reaction product in a good solvent to form a solution; and adding a solvent into the solution to precipitate the polyester, wherein the good solvent is dichloromethane, chloroform, toluene, benzene, acetone, or tetrahydrofuran, and the solvent is methanol, ethanol, or water.

* * * * *